May 19, 1959 S. MATLACHOWSKY 2,886,949
CONTROL OF TOOLS AND OTHER MOVABLE PARTS IN AUTOMATIC LATHES
Filed Oct. 11, 1956 2 Sheets-Sheet 1

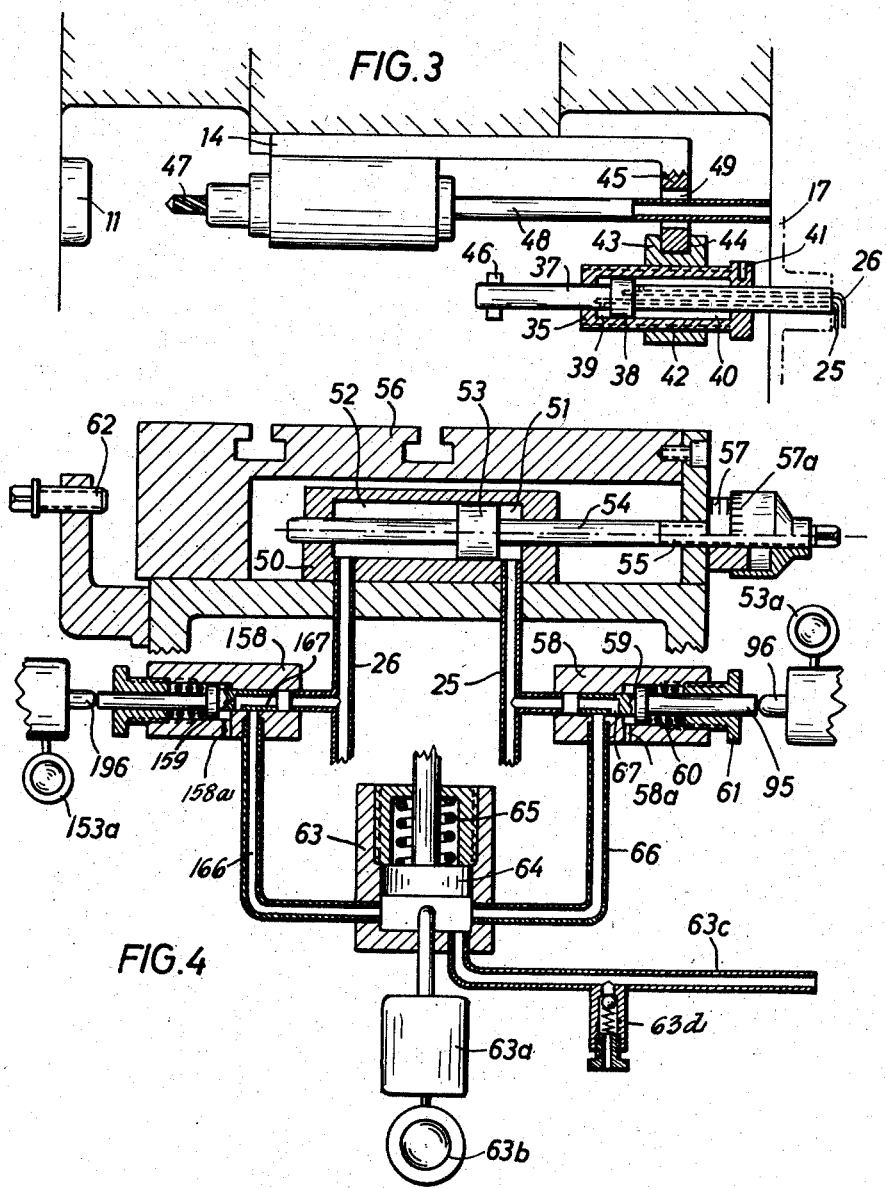

United States Patent Office 2,886,949
Patented May 19, 1959

2,886,949

CONTROL OF TOOLS AND OTHER MOVABLE PARTS IN AUTOMATIC LATHES

Stefan Matlachowsky, Uber Gutersloh, Westphalia, Germany, assignor to Alfred H. Schutte, Koln-Deutz, Germany, a German company Application October 11, 1956, Serial No. 615,340

Claims priority, application Germany October 15, 1955

8 Claims. (Cl. 60—54.5)

It is known in automatic lathes to control the tool slides and other movable parts by cams, levers, connecting rods or other mechanical elements, the control being effected indirectly by hydraulic transmission systems interposed between the mechanical control elements and the movable parts of the lathe. The arrangement is such that the mechanical elements actuate a pressure piston and the movements of the latter are transmitted through two closed columns of liquid to a working piston which is connected to the tool holder or other movable part of the lathe.

The object of the present invention is to provide such an arrangement which particularly satisfies practical requirements, in order to ensure satisfactory operation over a long period and to substantially eliminate breakdowns.

According to an aspect of the present invention the two columns of pressure oil working in opposition to one another and connected to a working cylinder are under the influence of spring-loaded compensating pistons which, during normal operation, despite certain fluctuations in the oil quantities, keep the pressure constant and balance out pressure surges, but which, if excessively high oil losses occur, open up ducts through which the quantities of oil are automatically replenished from a chamber under relatively high pressure. The two oil columns are advantageously controlled by two related single-acting pistons which carry racks and are connected to one another by a pinion meshing with the racks so that the two pistons move in opposite directions in a double cylinder. The two oppositely-acting pressure oil columns can be employed for controlling a single working piston or two or more working pistons.

The springs which load the individual compensating pistons are preferably adjustable so that the operating conditions ensuring the safe use of each tool or other part to be moved can be determined in accordance with the sensitivity of such tool.

The leakage oil losses which are to be replaced in the individual pressure oil columns can be made up from a cylinder which is under high pressure. Advantageously, the safety cylinders and the spring-loaded compensating pistons slidable therein are so constructed that an excess of oil greater than a predetermined amount can be released by opening of an outlet duct in the safety cylinder.

Further details of the invention will be explained hereinafter with reference to an illustrative embodiment of the invention which is shown in the accompanying drawings.

In the drawings:

Fig. 3 is an enlarged, fragmentary side elevational view, partly in section, and illustrating the operation of a spindle sleeve tool; and Fig. 4 is a schematic view of a hydraulic transmission system embodying this invention.

Figure 1:
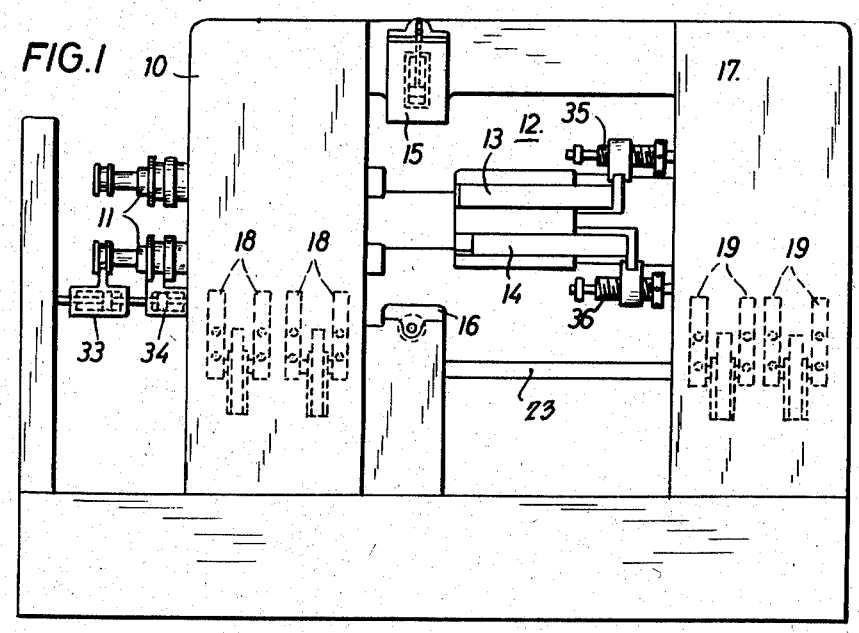
Fig. 1 is a schematic side view of a multi-spindle automatic lathe.

Referring to Fig. 1, it will be seen that, in the illustrated lathe, workpiece spindles 11 are mounted in a rotatable drum in a multi-spindle head stock 10 of the machine frame, while in the machining space 12 there are two slides 13 and 14 for longitudinal tools and also two slides 15 and 16 for laterally movable forming tools. Cam-controlled adjustable rocker arms 18 and 19 are arranged in the head stock 10 and in the gear case 17 at the front side of the lathe (Fig. 1) for operation by cams on a control shaft 23, while similar rocker arms 22 can be arranged at the rear side of the machine, and can be actuated by cams on a control shaft 24.

Figure 2:
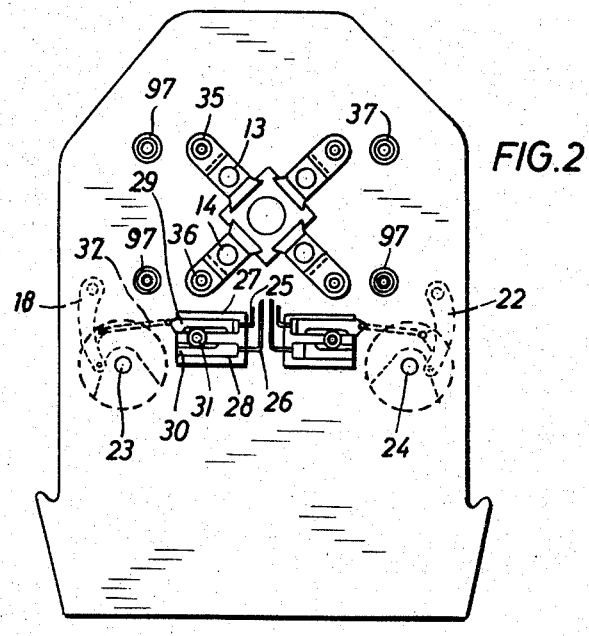
Fig. 2 is a vertical sectional view of the machining space, indicating the contours of the lathe.

Each individual tool holder or other part of the latter which is to be moved, is displaced in response to rocking of a related one of the rocker arms 18, 19 and 22 by means of a hydraulic transmission system that includes two separate hydraulic pressure oil columns which are contained, for example, in the oil pipes 25 and 26 (Figs. 2 and 4).

Figure 2 shows that the two pressure oil pipes 25 and 26 associated together in a pair communicate with separate control or pressure cylinders 27 and 28, respectively in which two single-acting pistons 29 and 30 are movable. The two pistons 29 and 30 are connected together by a pinion 31 which meshes with gear racks on the pistons and ensures that the latter always move in opposite directions to one another. Only one piston 29 is connected by a connecting rod 32 to the related rocker arm 18. The coupling pinion 31 makes it unnecessary to provide a special drive for the other piston 30.

Working cylinders 33 and 34 accommodate double-acting pistons (Fig. 1) and are provided for actuating a draw-in and a feeding collet. It will be understood that each of the working cylinders 33 and 34 has a pair of pressure oil pipes, similar to the pipes 25 and 26, extending to the working cylinder from a related pair of control or pressure cylinders, similar to the control cylinders 27 and 28. The above is also true of working cylinders 35 and 36 for actuating the longitudinal tool holders 13 and 14.

Fig. 3 shows the constructional details of the longitudinal tool holder 14 and its associated working cylinder 35. A piston rod 37 received in cylinder 35 has a screw-threaded end received in a topped hole in the end wall of the gear case 17. The two associated or paired pressure oil pipes 25 and 26 are connected to parallel longitudinal ducts in the piston rod 37 and respectively open in front of and behind, a piston disc 38 on rod 37 to communicate with the cylinder chambers 39 and 40, respectively. The piston disc 38 and the piston rod 37 both have circular cross-sections so that cylinder 35 can be rotated relative to the piston 38 and this rotation is carried out, for example, by using any desired tools which can engage in a key opening 41 in the cylinder. The cylinder 35 is also of circular cross-section and is provided with external screw threads 42 on which there engages a driver 43 having a forked recess 44 engaged by a bent-over end 45 of the tool holder 14. Thus, as the control pistons 29 and 30 move in opposite directions the columns of oil in pipes 25 and 26 cause a corresponding axial displacement of cylinder 35 along its relatively stationary piston rod 37.

It should also be mentioned that the piston rod 37 carries an abutment 46 which, for example, limits the feed movement of the tool carried by holder 14 which is shown as a drill 47 driven by way of a spindle sleeve 48 extending through a hole 49 in the tool holder 14.

The feed travel of the drill 47 can be adjusted in a simple manner by turning the threaded end of piston rod 37 in the end wall of the gear case 17 and thereby displacing the piston rod in the axial direction with the result that the abutment 46 is displaced relative to the workpiece which is held by the spindle 11. The cylinder 35 may also be rotated, while preventing turning of the driver 43. This causes the driver 43 to move axially relative to the cylinder 35, so that the tool holder 14 is displaced relative to the cylinder 35. Thus, there are various possible methods of quickly and easily limiting the feed travel of the tool 47. Normally there is no need to provide adjustable limiting means for the return travel, since the cylinder 35 can readily be returned rearwards until it abuts against the end wall of the gear case 17.

Fig. 4 illustrates another arrangement of a working cylinder 50 controlled by the pressure oil pipes 25 and 26 which open through the wall of the fixed cylinder 50 into the working chambers 51 and 52 at the opposite sides of a movable working piston 53. The piston rod 54 of piston 53 is in this case adjustably connected to a related tool holder 56 by means of a threaded portion 55 screwed in a tapped hole in an end wall of the tool holder and the setting is facilitated by scales 57 and 57a which extend longitudinally and radially, respectively. Alternate admission of pressure oil from pipes 25 and 26 into the two cylinder chambers 51 and 52, respectively, results in the tool holder 56 being moved backwards and forwards.

Fig. 4 shows more particularly a safety and compensating cylinder 58 which opens, at one end, into the pressure oil pipe 25, and slidably receives a piston 59 which is urged by a compression spring 60 in the direction toward pipe 25. The force exerted by spring 60 on piston 59 can be adjusted by screw 61. The free end of a piston rod 95 projecting from piston 59 abuts against a limit switch 96 which can be arranged in the circuit of the driving motor (not shown) of the automatic lathe and to halt operation of the lathe, or of parts thereof upon actuation of switch 96. A signalling lamp 53a, which is associated with each individual safety cylinder, is also controlled by the related limit switch and lights up in response to actuation of the latter. When the pressure oil flows into chamber 51 of cylinder 50 through the pipe 25, the piston 53 and with it the tool holder 56 moves towards the left, as viewed in Fig. 4 until the tool holder finally abuts against a stop 62 which, for adjustment purposes, may be constructed as an adjusting screw. A short extra travel on the part of the control piston 29 (Fig. 2) following engagement of holder 56 with stop 62 increases the pressure in pipe 25 and urges the compensating piston 59 toward the right from its normal position in opposition to the pressure of the spring 60. By means of the abutment screw 62 the amount of this extra travel of piston 29 is so adjusted that the limit switch 96 is not operated under normal conditions.

But if, for example, the tool 47 is blunt or if it encounters any obstacle so that the piston 53 can not move as pressure oil is fed through the pipe 25 prior to engagement of holder 56 with stop 62, considerable displacement of the piston 59 will take place in the compensating cylinder 58 in opposition to the loading of the spring 60, with the effect that the switch 96 is operated. Thus, the lathe is stopped before any part can be damaged or destroyed. It is possible for the operator, by adjusting the spring 60, to determine at what excess pressure in the pipe 25 the switch 96 is to be operated. Since each individual tool is controlled by way of two separate pressure oil pipes, such as, the pipes 25 and 26, and since at least the pipe 25, which conveys the pressure oil fed to the chamber 51 during the feed movement of the tool, is connected to a compensating cylinder 58, it is possible, as mentioned above, by suitably adjusting the screw 61, to determine accurately for each tool exactly the amount of force which is to be applied to move the tool in the feed direction, while the machine drive will be switched off in the manner described if that amount of force is exceeded. Similarly, in the case of a slight deficiency of oil in the pipe 25, the spring 60 moves compensating piston 59 toward the left, as viewed in Fig. 4, so that slight pressure oil losses are automatically compensated for without thereby impairing the control of the working piston 53.

If there are relatively great pressure oil losses, the amount of oil in pipe 25 is automatically replenished from a pressure cylinder 63 accommodating a slidable piston 64 which is under the influence of a compression spring 65. As is shown in Fig. 4, the compensating piston 59 has a bore 67 therein which at one end, opens axially at the end of the piston facing toward the pipe 25 and, at its other end, opens laterally at the side surface of the compensating piston. A feed pipe 66 extends from the pressure cylinder 63 and opens into the interior of cylinder 58 at a suitably selected location along the latter so that the piston 59 normally closes the end of pipe 66 opening into cylinder 58, but the occurrence of an excessive loss of pressure oil from pipe 25 causes spring 60 to move compensating piston 59 toward the left, as viewed in Fig. 4, until the lateral opening of bore 67 registers with the exit opening of feed pipe 66, thereby to establish communication through bore 67 between feed pipe 66 and pipe 25. The spring 65 loads the piston 64 sufficiently so that the quantity of oil required is forced through the pipe 66 into the pipe 25 as soon as the bore 67 in the piston overlaps the exit end of the feed pipe 66, the piston 59 being returned to its normal position closing pipe 66 when the oil in pipe 25 has been replenished to increase the pressure of oil acting on piston 59 in the direction opposed to spring 60. Thus, the pipe 66 is closed again automatically after filling-up has been completed.

If, on the other hand, there is an excessive quantity of oil in the pipe 25, this is also automatically discharged as soon as the transverse opening of the bore 67 enters an increased diameter chamber in the cylinder 58. The surplus oil can then pass out through a duct 58a which extends from such increased diameter chamber into the open or into a collecting chamber (not shown).

Fig. 4 shows that the oil column in the pipe 26 is connected in the same manner to a separate compensating cylinder 158 containing a compensating piston 159 which is adjustable in similar fashion. The compensating cylinder 158 and its piston 159 have parts associated therewith in the same manner as has been described above with reference to cylinder 58 and piston 59, and such parts are identified by the same reference numerals, but with the numeral "1" as a prefix thereto. The two compensating cylinders 58 and 158 communicate with the same excess pressure cylinder 63. Thus, oil losses from the two columns of oil in pipes 25 and 26 are replaced from the cylinder 63. If necessary, oil is fed continuously to cylinder 63 by an oil pump (not shown) through the pipe 63c and in this case, the oil is kept at a constant pressure by a regulating valve 63d. If for any reason oil losses nevertheless occur in the pressure cylinder 63, a switch 63a is actuated by the piston 64 halts operation of the lathe. Further, actuation of switch 63a causes a control lamp 63b to light up and show the operator the reasons for the stoppage.

Although the compensating cylinders 58 and 158 have been specifically illustrated in association with the pipes 25 and 26 extending to working cylinder 53, it is to be understood that each pair of pipes extending to the other working cylinders, for example, the working cylinders 33, 34, 35 and 36, has a similar arrangement associated therewith.

In addition to the usual working cylinders for the transverse and longitudinal tool holders, it is readily possible to provide other additional working cylinders

I claim:

1. In a hydraulic control system having an actuated transmitter unit, a receiver unit including a working cylinder with a working piston in the latter and two hydraulic fluid containing pipes extending from said transmitter unit and opening into said working cylinder at the opposite sides of said working piston to cause relative movement of the working piston and cylinder in response to actuation of said transmitter unit; the combination of a compensating cylinder connected with at least one of said pipes, means communicating one end of said compensating cylinder with said one pipe, a compensating piston reciprocable in said compensating cylinder, spring means urging said compensating piston toward said one end of the compensating cylinder so that the position of said compensating piston in the compensating cylinder is determined by balancing of the force exerted by said spring means and of the opposed force exerted by the pressure of hydraulic fluid in said one pipe, thereby to compensate for slight deficiencies and excesses of hydraulic fluid in said one pipe, a source of hydraulic fluid under pressure, and a feed conduit connected, at one end, to said source and opening, at its other end, into said compensating cylinder, said other end of said feed conduit being normally closed by said compensating piston, said compensating piston having a passage extending therethrough to register with said other end of the feed conduit when said compensating piston assumes a position in the compensating cylinder corresponding to a predetermined deficiency in the amount of hydraulic fluid in said one pipe so that the latter is thereby communicated with said feed conduit by way of said passage for replenishing of the hydraulic fluid in said one pipe from said source.

2. In a hydraulic control system; the combination as in claim 1, wherein said compensating cylinder has a discharge port which is normally isolated from said one end of the compensating cylinder by said compensating piston, said passage of the compensating piston communicating with said discharge port, to permit hydraulic fluid to escape through the latter from said one pipe, when said compensating piston assumes a position in the compensating cylinder corresponding to a predetermined excess of hydraulic fluid in said one pipe.

3. In a hydraulic control system; the combination as in claim 2, wherein said spring means includes a spring member acting, at one end, against said compensating piston, and an adjustable abutment engaging the other end of said spring member for adjustably determining the spring force on said compensating piston and thereby adjustably establishing said predetermined deficiency and predetermined excess of hydraulic fluid in said one pipe.

4. In a hydraulic control system; the combination as in claim 1, further comprising switch means to operate, when actuated, a control circuit and a signalling device, and switch actuating means movable with said compensating piston to actuate said switch means when said compensating piston assumes a position in the compensating cylinder corresponding to a predetermined excess of pressure in said one pipe.

5. In a hydraulic control system; the combination as in claim 1, wherein said source of hydraulic fluid under pressure includes a supply cylinder having a piston reciprocable therein and a supply of hydraulic fluid in the supply cylinder acted upon by said piston in the latter and a spring acting on said piston in the supply cylinder to apply a pressure to the supply of hydraulic fluid in the latter.

6. In a hydraulic control system; the combination as in claim 5, further comprising means for replenishing the supply of hydraulic fluid in said supply cylinder.

7. In a hydraulic control system; the combination as in claim 5, further comprising switch means actuable by said piston in the supply cylinder upon a predetermined depletion of the supply of hydraulic fluid in the latter and provided to operate, when actuated, a control circuit and a signalling device.

8. In a hydraulic control system; the combination as in claim 1 wherein an individual compensating cylinder communicates, with each of said two pipes, and said source of hydraulic fluid under pressure is common to both compensating cylinders.

References Cited in the file of this patent

UNITED STATES PATENTS

| | | |
|---|---|---|
| 2,468,489 | D'Arcey | Apr. 26, 1949 |
| 2,509,368 | Price | May 30, 1950 |
| 2,521,668 | Price | Sept. 5, 1950 |
| 2,604,757 | Wulleman | July 29, 1952 |